US008949849B2

(12) United States Patent
Hameleers et al.

(10) Patent No.: US 8,949,849 B2
(45) Date of Patent: Feb. 3, 2015

(54) METHOD AND DEVICES FOR DYNAMIC MANAGEMENT OF A SERVER APPLICATION ON A SERVER PLATFORM

(75) Inventors: Heino Hameleers, Kerkrade (NL); Frank Hundscheidt, Kerkrade (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2379 days.

(21) Appl. No.: 10/508,300

(22) PCT Filed: Mar. 25, 2002

(86) PCT No.: PCT/EP02/03302
§ 371 (c)(1),
(2), (4) Date: Sep. 20, 2004

(87) PCT Pub. No.: WO03/081421
PCT Pub. Date: Oct. 2, 2003

(65) Prior Publication Data
US 2005/0160429 A1    Jul. 21, 2005

(51) Int. Cl.
*G06F 9/46* (2006.01)
*G06F 15/173* (2006.01)
*G06F 15/16* (2006.01)
*H04L 29/08* (2006.01)

(52) U.S. Cl.
CPC .................................. *H04L 67/125* (2013.01)
USPC ........... 718/105; 718/104; 709/224; 709/226; 709/229

(58) Field of Classification Search
USPC .............. 718/1, 100, 101, 102, 103, 104, 105
See application file for complete search history.

(56) References Cited

U.S. PATENT DOCUMENTS

| 5,774,668 | A | * | 6/1998 | Choquier et al. | 709/223 |
|---|---|---|---|---|---|
| 5,948,065 | A | * | 9/1999 | Eilert et al. | 709/226 |
| 5,956,489 | A | * | 9/1999 | San Andres et al. | 709/221 |

(Continued)

FOREIGN PATENT DOCUMENTS

| EP | 0384339 A | 8/1990 |
|---|---|---|
| EP | 0942363 A | 9/1999 |

(Continued)

OTHER PUBLICATIONS

3rd Generation Partnership Project; Technical Specification Group Services and System Aspects; Architecture Principles for Release 2000. 3G TR 23.921 v1.0.1 (Jul. 2000).

(Continued)

*Primary Examiner* — Abdullah Al Kawsar

(57) ABSTRACT

Method, devices and computer programs for a dynamic management of a first server application on a first server platform (SP1) of a telecommunication system are disclosed wherein a further server application is operating or installable on the first server platform (SP1) or a further platform (SP2). The first server platform (SP1) has a maximum processing capacity and a capacity fraction of the maximum processing capacity is assignable to the first server application reserving the capacity fraction for processing the first server application. A determination (F10) of a required processing capacity for processing at least one of the first server application and the further server application, an analysis (F20) of the required processing capacity for an assignment of the capacity fraction to the first server application, and an assignment of the capacity fraction are performed.

6 Claims, 8 Drawing Sheets

(56) References Cited

U.S. PATENT DOCUMENTS

| | | | |
|---|---|---|---|
| 6,003,061 A * | 12/1999 | Jones et al. | 718/104 |
| 6,086,618 A * | 7/2000 | Al-Hilali et al. | 703/2 |
| 6,167,427 A * | 12/2000 | Rabinovich et al. | 709/201 |
| 6,173,322 B1 | 1/2001 | Hu | |
| 6,418,459 B1 * | 7/2002 | Gulick | 718/104 |
| 6,473,085 B1 * | 10/2002 | Brock et al. | 345/502 |
| 6,560,325 B2 * | 5/2003 | Brown et al. | 379/207.02 |
| 6,725,454 B1 * | 4/2004 | Nagel et al. | 718/104 |
| 6,901,446 B2 * | 5/2005 | Chellis et al. | 709/226 |
| 7,203,700 B1 * | 4/2007 | Kumar et al. | 1/1 |
| 7,203,746 B1 * | 4/2007 | Harrop | 709/224 |
| 7,219,347 B1 * | 5/2007 | Waddington | 718/104 |
| 7,640,547 B2 * | 12/2009 | Neiman et al. | 718/104 |
| 2002/0065864 A1 * | 5/2002 | Hartsell et al. | 709/100 |
| 2002/0107026 A1 * | 8/2002 | Agrawal et al. | 455/453 |
| 2003/0023661 A1 * | 1/2003 | Clohessy et al. | 709/104 |
| 2003/0037092 A1 * | 2/2003 | McCarthy et al. | 709/104 |
| 2003/0046396 A1 * | 3/2003 | Richter et al. | 709/226 |
| 2003/0061260 A1 * | 3/2003 | Rajkumar | 709/104 |
| 2003/0069974 A1 * | 4/2003 | Lu et al. | 709/226 |
| 2003/0120780 A1 * | 6/2003 | Zhu et al. | 709/226 |
| 2003/0172145 A1 * | 9/2003 | Nguyen | 709/223 |
| 2005/0174353 A1 * | 8/2005 | Alcorn et al. | 345/506 |

FOREIGN PATENT DOCUMENTS

| | | | |
|---|---|---|---|
| EP | 0959585 A | 11/1999 | |
| EP | 1189403 A1 * | 3/2002 | H04L 29/06 |
| WO | WO 0163403 A | 8/2001 | |

OTHER PUBLICATIONS

European Patent Office, International Search Report for PCT/EP02/03302, dated Dec. 16, 2003.

* cited by examiner

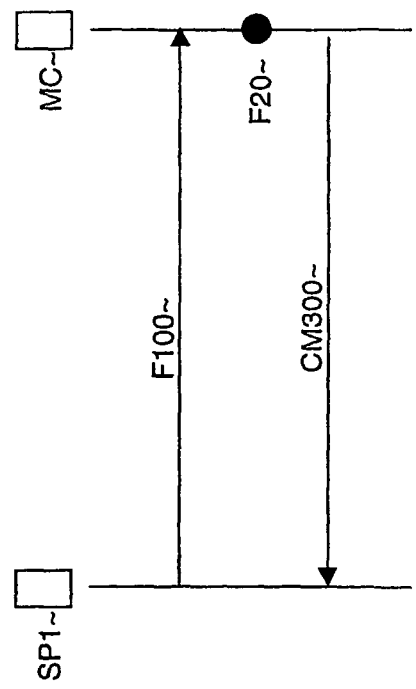
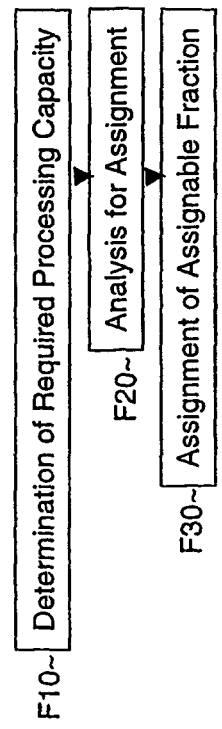
Fig. 1a
Fig. 1b

METHOD AND DEVICES FOR DYNAMIC MANAGEMENT OF A SERVER APPLICATION ON A SERVER PLATFORM

CLAIM OF PRIORITY

This application is a 371 of International Application No. PCT/EP02/03302, filed Mar. 25, 2002. The disclosure of this document is hereby incorporated herein by reference.

TECHNICAL FIELD OF THE INVENTION

The present invention relates to the field of telecommunication, especially to a method for dynamic management of a server application on a server platform of a telecommunication system. The invention also concerns devices and computer programs adapted to execute the proposed method.

BACKGROUND OF THE INVENTION

In telecommunication systems and especially mobile telecommunication systems like the Global System for Mobile communication (GSM) or the Universal Mobile Telecommunication System (UMTS), different network elements like the Home Subscriber Server (HSS), the Mobile-services Switching Center (MSC), the Serving General packet radio service Support Node (SGSN), the Call Session Control Function (CSCF) are realized by server applications operating on server platforms (a good overview is given in 3GPP Technical Specification Group Services and System Aspects; Network Architecture (Release 5), TS 23.002, version 5.5.0 (2002-01)). In the content of the following text, a server application is understood by computer software installable on a server platform that is a hardware computing device. The server platform may be supplemented by software like an operating system necessary for operating the server application. The server application operating on the server platform forms the respective network element as mentioned above.

A dedicated server platform allows the operation of a specific type of server application. Other types of server applications cannot be processed by the dedicated server platform. A dedicated server platform incorporates dedicated hardware and/or software components that are specifically designed for the operation of a specific type of server application. These dedicated components exclude other types of server application from the operation on the dedicated server platform.

The usage of dedicated server platforms takes a lot of effort to develop, to manufacture, to install and to maintain many different dedicated server platforms for many different types of server applications in parallel. Server platforms that allow the installation and operation of multiple types of server applications on a single server platform are therefore advantageous compared to dedicated server platforms. A server platform providing such functionality is often named common server platform and uses common processing components that are accessible and sharable by the server applications. Examples for such common processing components are processors, memory devices, operating systems, signaling terminals, interworking devices, line terminals, or codecs. The processing capacity set up by the common processing components of a server platform defines a maximum processing capacity usable for processing one or more server applications on the server platform. Examples for the maximum processing capacity are a maximum number of computing steps per time unit or the maximum static or dynamic memory, a maximum processing capability or equivalent numbers like the maximum number of subscribers that can be served by a server platform of a mobile telecommunication system.

When multiple server applications are operating on a server platform, the server applications typically compete for processing capacity. In peak situations when the processing capacity required by server applications approaches or even exceeds the maximum processing capacity of the server platform a troublesome operation of the affected server platform or server applications can be expected. As a consequence, the server platform or one or more server applications can fail or the Quality of Service (QoS) provided by server applications can be reduced. Examples for a reduced QoS are delayed or disturbed voice or data transmission or even the loss of a connection. If no control mechanism is applied, the server applications compete in an uncontrolled way for processing capacity. This uncontrolled competing is especially unsatisfactory for server applications offering services where a troublesome operation may not be tolerable. As an example, heavily disturbed voice calls are generally not tolerated whereas a delay in data traffic e.g. for messages via emails or short-messages system (SMS) may be tolerated to a certain extent by the user of a telecommunication system.

A configuration of the server platform overcomes the problem of an uncontrolled competing for processing capacity to a certain extent. A fraction of the maximum processing capacity of a server platform can be assigned to a server application for processing said server application. Further server applications that may be installed to the server platform or operating on the server platform are excluded from being processed by the capacity fraction. Depending on the implementation, further fractions of the maximum processing capacity may be reserved for further server applications thus setting a fixed upper limit for the processing capacity that can be utilized per server application. The assignment of a capacity fraction of the maximum processing capacity can be achieved during installation of the server application or during operation by an operator, e.g. directly at the server platform or remotely via an Operation and Maintenance (O&M) center by setting a value for the capacity fraction for the server application. After the assignment, the fraction of the maximum processing capacity that is reserved for processing the respective server application remains fixed until the operator decides to assign a new value.

The present management possibilities like the installation of a server application to a server platform, the de-installation of a server application from a server platform, or the assignment of a fraction of the maximum processing capacity of a server platform to a server application, are static and do not adequately address the required processing capacity of one or more server applications in the telecommunication system. The required processing capacity typically changes over time, e.g. due to a change in the number of subscribers registered to a server application, or is influenced by events like failures or system procedures like location updates. A management by configuration does not adequately address especially changes or fluctuations of the required processing capacity thus leading to a reduced performance of the server applications or the server platforms of the telecommunication system. In addition, a management by configuration is not capable to optimize the utilization of processing capacity. For example, the fraction of the maximum processing capacity may be assigned for the processing of a server application such that the expected peak utilization may never be exceeded. This configuration approach ensures optimum performance for the server application while leaving portions of the capacity fraction unused in non-peak situations. A higher utilization of the capacity fraction is achieved for a configuration where the fraction is assigned for example to the average of the expected utilization fluctuations, which is, however, at the expense of troublesome operation in peak situations. In addition, the operator-executed management is very inefficient as it needs a lot of manpower for supervision and executing the management, and is very likely to be unreliable, especially if multiple server applications on multiple server platforms are managed.

SUMMARY OF THE INVENTION

It is an object of the present invention to provide an improved method, devices and computer programs that allow a dynamic management of server applications on server platforms of a telecommunication system for a performance optimization of the server applications and a utilization optimization of the server platforms.

This object is achieved by the method, the device and the computer program as described in the independent claims of the present application. Advantageous embodiments are described in the further claims.

The proposed method executes a dynamic management of a first server application being operating or installable on a first server platform of a telecommunication system. In a telecommunication system typically multiple server platforms and multiple server applications exist. Therefore, there are cases that a further server application is operating or installable on the first server platform or a further server platform. The first server platform has a maximum processing capacity and a capacity fraction of the maximum processing capacity is assignable to the first server application for processing the first server application on the first server platform. The capacity fraction is reserved for processing the first server application, i.e. when assigned to the first server application, the capacity fraction is used only for processing the first server application excluding other server applications like the further server application to be processed by this capacity fraction.

For carrying out the proposed method, at least the following steps are executed: first of all, a determination of a required processing capacity for processing at least one of the first server application and the further server application is executed. The required processing capacity is the processing capacity required or expected to be required by the first server application or the further server application, e.g. for providing optimum processing of the respective server application or if one of the server applications being not on one of the server platforms is requested on that one server platform. The required processing capacities of both server applications may also be determined. The required processing capacity can range from zero and may even exceed the maximum processing capacity, e.g. in peak situations. The required processing capacity may be indicated by the server applications or the server platforms.

An analysis of the required processing capacity for an assignment of the capacity fraction to the first server application is executed. The main objective of the analysis is to verify if and for what conditions and circumstances the requirement can be satisfied. In the analysis it may be checked to which of the server applications the determined required processing capacity is related, e.g. whether the required processing capacity relates to the first server application or the further server application or to both server applications. If the required processing capacity is related only to the first server application, it may be necessary to request the required processing capacity of the further server application or vice versa. It may be checked if a capacity fraction exists that is assigned to one of the server applications and if the required processing capacity for that server application exceeds this capacity fraction. This check may be executed for any of the server applications and server platforms. It may be analyzed if an assignment of the capacity fraction to the first server application has consequences for the processing of the further server application. If the capacity fraction for the first server application is increased, an improved QoS for the first server application at the expense of a reduced QoS for the further server application may be a possible consequence. If the capacity fraction is decreased e.g. because of a lower required processing capacity for the first server application, more processing capacity exists for the further server application improving QoS for the further server application. In the analysis, the capacity fraction for the first server application is determined, e.g. by determining a value for the capacity fraction. This value can range from zero to the maximum processing capacity of the first server platform. The value may be taken from a look-up table that relates required processing capacities to predefined values or may be dynamically generated. Because of a possible interdependence between the server applications and server platforms in the telecommunication system, scenarios may be verified in the analysis with different trial values for the capacity fraction in order to check for results of the dynamic management. Based on the results of the scenarios, one of the trial values may be selected as the value for the assignment of the capacity fraction.

A management command may be generated comprising an instruction for the first server platform to set the capacity fraction to the value determined from the analysis. Finally, the assignment of the capacity fraction is executed on the first server platform, i.e. the capacity fraction is assigned to the value determined by the analysis and the capacity fraction is reserved for processing the first server application.

If more than one entity is involved, messages can be used for the determination of the required processing capacity or the assignment of the capacity fraction. The determination of the required processing capacity may be achieved by one or more messages that are sent from one or more of the server applications or server platforms, e.g. by push messages. Alternatively, one or more messages may be used to request the required processing capacity from the at least one server application or server platform, e.g. using pull messages.

The proposed management method solves the problem to manage server applications on server platforms in a dynamic way as it is capable to determine a required processing capacity, to analyze the required processing capacity, and to assign a capacity fraction to the managed server application based on the analysis of the required processing capacity. Fluctuations of the required processing capacity of a server application can therefore be adequately addressed which may be used to optimize the performance like QoS for the dynamically managed server application. As an example, the capacity fraction of the first server application can be assigned according to the required processing capacity, e.g. for a higher required processing capacity of the first server application, an increased capacity fraction can be assigned. As a second example, the further server application may indicate a required processing capacity on the first server platform or the further server platform. The capacity fraction of the first server application on the first server platform may be changed according to that required processing capacity, e.g. if the further server application indicates a lower required processing capacity on the first server platform, the capacity fraction of the first server application may be increased for optimum performance of the first server application. Alternatively, if the further server application indicates a higher required processing capacity on the further server platform, the capacity fraction of the first server application may be decreased for providing additional processing capacity for the further application. In the latter example, the further server application may access the additional processing capacity on the first server platform remotely from the further server platform. The capacity fraction for the first server application may not necessarily exist on the first server platform from the start of the proposed method but may be introduced by the analysis and the assignment on the first server platform. An optimized utilization of the maximum processing capacity can be achieved by the proposed dynamic management method, e.g. if the required processing capacity determined for the first server application indicates a lower value than the capacity fraction, the latter may be reduced leaving more processing capacity for any further server applications. The proposed method can be executed in very fine temporal intervals increasing the accuracy of the dynamic management.

According to a preferred embodiment, the maximum processing capacity is determined by common processing components and the assigned capacity fraction is a subset of the common processing components. A common processing component is a processing component sharable for processing of server applications of different type in contrast to a dedicated processing component that can be used only for the processing of a selected type of server application. The usage of common components is advantageous as it ensures that server applications of a different type may be installed or operated on the server platforms and share the common processing components. The subset may be formed by discrete common processing components that are allocatable for processing a server application or by a logical partition of the maximum processing capacity. The allocation of discrete common processing components may be achieved e.g. by determining component identifiers identifying the common processing components of the subset and reserving the discrete common processing components according to the determined component identifiers. A logical partition of the maximum processing capacity may be reserved according to the value determined for the assignment in the analysis. The allocation of discrete processing components for the processing of a server application may lead to a faster or more effective processing compared to the setting of a logical partition. On the other hand, a logical partition may offer more flexibility as it allows to set the subset in a non-discrete manner.

According to another preferred embodiment, a further capacity fraction is assignable on at least one of the server platforms and a further assignment of the further capacity fraction is executed as a result of the analysis. The assignment of the further capacity fraction may supplement the assignment of the capacity fraction for the first server application. By introducing further capacity fractions, the method can be easily adapted to manage multiple server applications on multiple server platforms in parallel making the proposed method more efficient. For example, if the capacity fraction of the first server application on the first server platform is increased, the capacity fraction of the further server application may be decreased to allow the increase of the capacity fraction of the first server application. In order to still provide QoS for the further server application, a further capacity fraction may be assigned to the further server application on a further server platform for compensating the reduction of processing capacity for the further server application on the first server platform.

According to another preferred embodiment, a utilization of a maximum processing capacity or an assigned capacity fraction is checked in the analysis. Examples are the utilization the maximum processing capacity of the first server platform, a maximum processing capacity of the further server platform, the capacity fraction, and the further capacity fraction. One or more utilizations may be monitored, e.g. by the first server platform or the further server platform, and may be indicated when the utilization approaches or exceeds a threshold value. Alternatively, one or more of the utilizations may be requested for the analysis, e.g. within the determination of the required processing capacity. The utilization may be directly interpreted as the required processing capacity, e.g. of a server application using a non-assigned fraction of the maximum processing capacity, or the utilization may be further processed in order to determine the required processing capacity, e.g. for future estimations.

According to another preferred embodiment, resources for users of the telecommunication system are related to at least one of the server platforms or server applications in the telecommunication system in the determination of the required processing capacity. The resources can be requested by or attributed to users. As an example, one or more users may request for a service provided by a server application on a server platform. Alternatively, the resources may be a bandwidth or a number of connections or addresses, e.g. Internet Protocol (IP) addresses. The related resources can be used to determine the required processing capacity on a server platform or server application base. Alternatively, the resources may be related to regions or areas of the telecommunication system.

Especially, a counted number of users can represent said resources. The number of users can be counted per server platform or per server application or per region or area and can be directly used as the required processing capacity in the analysis. The counted number may represent multiple resources, e.g. for addressing the use of multiple connections per user. As an example, the location update mechanism in a mobile telecommunication system may be used to count the number of users that are currently registered to a server application. The counted number per server application is preferably stored and indicated for the determination of the required processing capacity. The storing of the number is advantageous because it avoids the counting of the users whenever the counted number is required.

A time or an event may trigger the determination of the required processing capacity. A look-up table may be used that relates required processing capacities for different times. For a determined time, a predefined or dynamically generated required processing capacity may be taken from the look-up table. Alternatively, the time may trigger a request to the server platform or server application for the required processing capacity to be indicated, e.g. by an indication of a utilization for certain daytimes. Furthermore, also an event may be used to set-up an event-triggered dynamic management. An event may be a failure or disturbance of a server platform or a server application or a link or a system procedure like a location update. The frequency of occurrence of failures of one of the server applications might be used as input for determining the required processing capacity. The introduction of a trigger by time or event makes the procedure easy to implement and more flexible.

According to another preferred embodiment, an installation or a de-installation of at least one of the server applications is executed on at least one of the server platforms as a result of the analysis, e.g. if the required processing capacity of a server application is zero it may be de-installed. On the other hand, the required processing capacity can indicate that a new service is requested. As a result, the capacity fraction of the first server application may be decreased and a further server application may be installed for providing the new service on the first server platform. The assignment and a start of the utilization may be delayed with respect to the installation in order to reduce setup delays. By supplementing the assignment with further management commands for installation or de-installation, the proposed dynamic management becomes more flexible and can be used to better utilize the maximum processing capacity of the server platforms.

Especially, server applications can be transmitted for installation. One or more of the server applications may be stored on one or more of the server platforms of the telecommunication system. A server application to be installed on a server platform without said server application can thus be transmitted from a further server platform. If said server application is stored on multiple server platforms, the server platform closest to the server platform where said server application is to be installed may be selected for transmission.

According to another preferred embodiment, network information for at least one of the server applications or server platforms is considered in the analysis. The network information may be at least one of a priority, a location, or a capacity. One or more priorities may be attributed per server application or server platform, e.g. by O&M, and may indicate an importance of a server application, e.g. whether a reduction in QoS is tolerable for a server application. Priorities may also represent costs, e.g. in order to charge server applications differently on different server platforms or daytimes or depending on the utilization. A look-up table may be used that relates server applications with attributed priorities. It may be advantageous to attribute different priorities for different times per server application, e.g. in order to differentiate between working hours and weekend. The determination of a priority and the analysis may be carried out as follows: for the first server application requiring more processing capacity, it is analyzed if the further server application may be disturbed if the required processing capacity is assigned. In this case, the priorities of both server applications can be checked. For the case that the priority of the further server application indicates that a disturbed processing is tolerable, the capacity fraction of the first server application can be assigned according to the required processing capacity. The processing capacity for processing the first server application may not be changed if the further server platform has a priority indicating that a reduction of the processing capacity is not allowed. In addition or alternatively, priorities related to costs or the location of the server platforms and server applications may also be checked.

Furthermore, network information related to one or more capacities may be checked. The capacity represents the actual configuration of the telecommunication system, e.g. maximum processing capacities, capacity fractions, common processing components, or the capacity (e.g. bandwidth) of links, but also information about how much processing capacity is to be utilized by a server application e.g. for processing a certain number of users of the telecommunication system. The usage of the network information makes the proposed method even more versatile and may be especially implemented for a dynamic management on network level, i.e. managing multiple server applications on multiple server platforms of a complex telecommunication system. A map indicating the network information like the physical location of the server platforms and server applications, priorities and capacities may be used for a management on network level. The map may be supplemented by status information for the server applications, e.g. installed, stored or operating on which server platform, by links, and by utilization of processing capacity per server application.

Typically, the telecommunication system consists of multiple entities and the network information is distributed within the telecommunication system. According to another preferred embodiment, at least one synchronization is performed with respect to the network information. The synchronization is advantageous as it updates the network information on changes introduced into the telecommunication system by the dynamic management, e.g. with respect to a result of the assignment, the further assignment, the installation, or the de-installation executed on any of the server platforms.

In order to provide a dynamic management on network level, the analysis is preferably executed by a management center for the server applications in the telecommunication system. The management center is preferably a centralized network node having access to many server applications on many server platforms. The management center has interfaces for the determination of the required processing capacity or for the assignment. In addition, it may also have interfaces for sending further management commands like installation or de-installation. The management center may be operated on a dedicated server platform or may be operated on a common server platform together with one or more further server applications, e.g. it can be operated in conjunction with an O&M center in a telecommunication network or a home subscriber server in a mobile telecommunication network. The assigned value for the capacity fraction may be sent from the management center to the first server platform by a command message. The command message may be supplemented with further management commands like installation, de-installation, or further assignments.

According to another preferred embodiment, the required processing capacity is determined by a data center. The data center collects and manages subscriber data of the telecommunication system, e.g. it supervises the number of users registered to the server applications or server platforms of the telecommunication system. The data center can provide the required processing capacity as input for the analysis, e.g. to the management center. Existing telecommunication systems often have one or more data centers like home subscriber servers in mobile telecommunication systems controlling the users registered to server applications or server platforms. It is advantageous to use said data centers in order to keep implementation effort low for the proposed method.

In the following, the management center for a telecommunication system is summarized in more detail. The management center can be adapted to all embodiments of the method as described above. In particular, the management center comprises a receiving unit, a transmission unit, and a processing unit. The receiving unit is adapted to receive an indication of a required processing capacity for processing at least one of a first server application and a further server application. The first server application is operating or installable on a first server platform of the telecommunication system. The further server application is operating or installable on the first server platform or a further server platform of the telecommunication system. Furthermore, the processing unit is adapted to execute an analysis of the required processing capacity for an assignment of a capacity fraction of a maximum processing capacity of the first server platform to the first server application. The transmitting unit is adapted to send an indication of the capacity fraction to the first server platform for the assignment of the capacity fraction.

According to a preferred embodiment of the management center, a trigger from a timer or from an occurrence of an event exists. The processing unit can be adapted to check the trigger and to obtain the required processing capacity as a consequence of the trigger.

In the following, the data center for a telecommunication system is summarized in more detail. The data center can be adapted to all embodiments of the method as described above. In particular, the data center comprises a receiving unit, a transmission unit, and a processing unit. The receiving unit is adapted to receive information of resources required for users of the telecommunication system. The processing unit is adapted to relate the resources to a first server platform or a first server application of the telecommunication system and to count the resources. The data center may relate the resources first and then count the related resources, or alternatively, it may count the resources first and then relate the counted resources. The transmitting unit is adapted to send an indication of the counted resources that are related to the first server platform or the first server application to an analysis entity for the telecommunication system. The indication may comprise an amount and a type identity for indicating the counted resource and an identifier for identifying the related server platform or server application. The analysis entity can further process, e.g. analyze, the indication and may be a management center according to any of the claims 14 to 22.

It can be advantageous that the management center and the data center are collocated or implemented on the same platform functionality or in one logical node.

The present invention also concerns computer programs comprising portions of software codes in order to implement the method as described above when operated on the management center or the data center. The computer programs can be stored on a computer readable medium. The computer-readable medium can be a permanent or rewritable memory within the management center or the data center or located externally. The computer programs can be also transferred to the management center or the data center for example via a cable or a wireless link as a sequence of signals.

A computer program exists that is loadable into a processing unit of a management center for a telecommunication system. The computer program comprises code adapted to obtain a required processing capacity for processing at least one of a first server application and a further server application. The first server application is operating or installable on a first server platform of the telecommunication system. The further server application is operating or installable on the first server platform or a further server platform of the telecommunication system. Furthermore, the computer program comprises code adapted to execute an analysis of the required processing capacity for an assignment of a capacity fraction of a maximum processing capacity of the first server platform to the first server application and to initiate a sending of an indication of the capacity fraction to the first server platform for the assignment of the capacity fraction.

A computer program exists that is loadable into the processing unit of a data center for a telecommunication system. The computer program comprises code adapted to relate resources required for users of the telecommunication system to a first server platform or a first server application of the telecommunication system, to count the resources, and to initialize a sending of the counted resources that are related to the first server platform or the first server application to an analysis entity for the telecommunication system.

In the following, detailed embodiments of the present invention shall be described in order to give the skilled person a full and complete understanding. However, these embodiments are illustrative and not intended to be limiting, as the scope of the invention is defined by the appended claims.

BRIEF DESCRIPTION OF THE DRAWINGS

FIG. 1a shows a flow-chart diagram of the basic steps of the present invention;

FIG. 1b shows exemplary messages and processes according to the basic steps of FIG. 1a;

DETAILED DESCRIPTION OF THE INVENTION

Figures 2A, 2B:
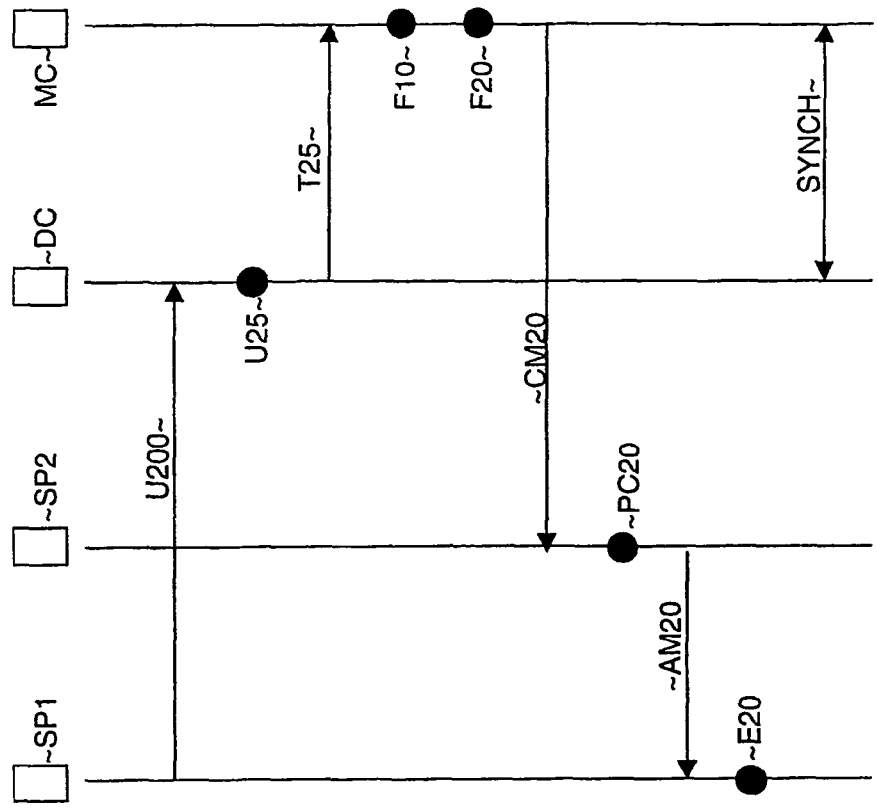
FIG. 2a shows a flow-chart diagram of a first embodiment of the present invention.
FIG. 2b shows exemplary messages and processes of the first embodiment of the present invention.

The following description focuses on the steps associated with messages or processes for carrying out the invented method. Depending on the implementation or case, it may be advantageous to integrate additional steps like a confirmation of a step before the next step is carried out.

The basic steps of the present invention are shown in FIG. 1a by a flow-chart diagram. Messages and processes that can be associated with the basic steps of FIG. 1a are shown in FIG. 1b for a management of a first server application (not shown in FIG. 1) on a first server platform SP1. The method starts with the determination F10 of a required processing capacity. The determination F10 can be triggered by the first server platform SP1, the first server application, the management center MC, or an event or a time or at least one further server platform or further server application (further server platforms or further server applications are also not shown in FIG. 1) of the telecommunication system. According to FIG. 1b, the required processing capacity may be indicated by the first server platform SP1 to the management center MC by a message F100, e.g. the message F100 may comprise an utilization of a maximum processing capacity of the first server platform SP1 by the first server application. The management center MC may request further required processing capacities of the one or more further server applications on the first server platform or the one or more further server platforms for executing the analysis F20 of the required processing capacity for the assignment F30 of a capacity fraction of the maximum processing capacity of the first server platform SP1 to the first server application. In the analysis F20, additional checks may be executed, e.g. it may be checked if the assignment F30 of the capacity fraction to the first server application SA1 may cause disturbances or a reduction of QoS of one of the server applications on the first server platform SP1 or optional further server platforms. Network information like priorities related to importance or costs, processing capacities or the location of the server platforms or server applications in the telecommunication system may be considered in the analysis. A reason for checking costs in the analysis may be that server platforms may charge server applications differently. Different charging may be the case when newer, more expensive hardware or software is used, when the server platforms are owned by different server platform providers or when server applications on a server platform belong to different operators. The cost may be different depending on the time of the day or the utilization of the server platform by a server application. Additional determination steps may be required for determining the further required processing capacities or network information for consideration in the analysis F20. Finally, the analysis outputs a capacity fraction to be assigned to the first server application on the first server platform SP1. The capacity fraction may be indicated by a value, e.g. a percentage of the maximum processing capacity of the first server platform SP1 to be reserved for processing the first server application.

The assignment F30 can be achieved by a transmission of a command message CM300 comprising the value as determined from the analysis F20 to the server platform SP1 and a setting of the capacity fraction according to the determined value of the command message CM300 on the first server platform SP1. Alternatively, the management MC center may select common devices according to the determined value. In this case, the command message CM300 may comprise common device identifiers identifying the common devices that are to be reserved for processing the first server application on the first server platform SP1. At the first server platform SP1, the capacity fraction can be assigned according to the common device identifiers comprised in the command message CM300.

The command message CM300 may be supplemented by one or more further management commands, e.g. for installation of a server application to the first server platform SP1, for de-installation of a server application from the first server platform SP1, or one or more further assignments of further capacity fractions. Installation of a server application may be achieved by the server application in file-format, the transport of a mobile agent, or by a servlet like a Java-servlet. De-installation of a server application from a server platform may also include a removal of a capacity fraction that has been assigned for processing the server application that is to be de-installed. The proposed method may stop after the execution of the previously mentioned management commands, but is preferably repeated and starts again with the determination of a required processing capacity.

Figure 9:
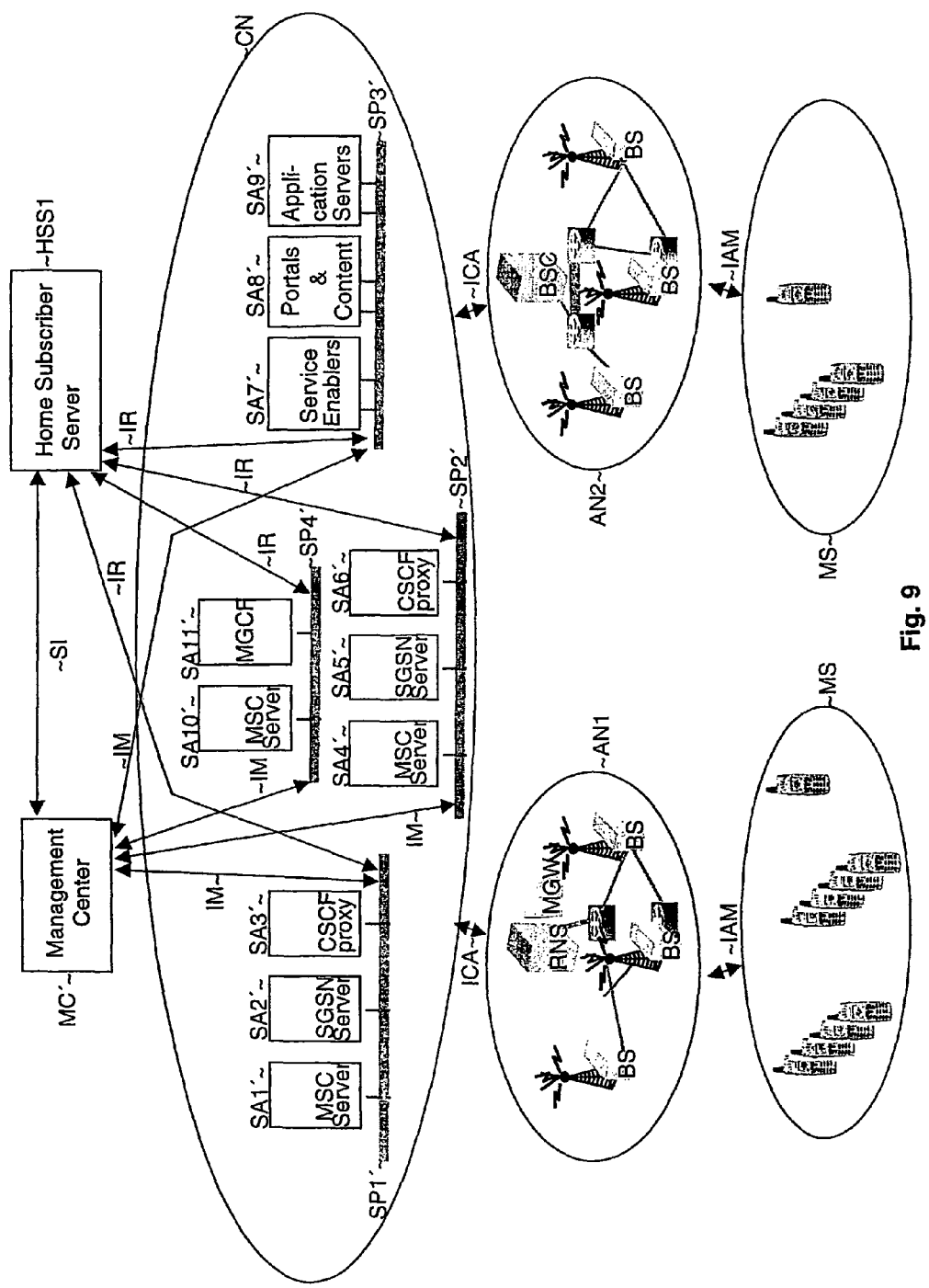
FIG. 9 shows an example for a telecommunication system with implemented invention.

The proposed method may be applied to more than one server application and more than one server platform of a more complex telecommunication network (see for example FIG. 9). Especially in the case of a more complex telecommunication system, the management center MC preferably has access to network information of the telecommunication system and the current utilization of processing capacities like the maximum processing capacities of the server platforms or the assigned capacity fractions by the server applications. By considering the network information and the processing capacities of the server platforms and server applications involved, the dynamic management can be executed very effectively on network level.

FIG. 2a shows a flow-chart diagram of a first embodiment of the present invention and FIG. 2b shows exemplary processes executed on devices like a first server platform SP1 and a further server platform SP2, a data center DC and a management center MC, and exemplary messages between the devices for executing the first embodiment. A determination U20 of utilization information, e.g. the utilization of the maximum processing capacity of the first server platform SP1 by the first server application or of other capacities as explained before, can be achieved in a way that the server platform SP1 sends U200 the utilization information about a first server application SA1 (not shown in FIG. 2) to the data center DC. The utilization information may comprise the actual utilization or a record of the utilization over time. The sending U200 of the utilization information may be achieved by one or more push- or pull-based messages. A push-based message is a message that is initiated e.g. by the first server platform SP1 or the first server application SA1 to the data center DC. The push-based message may be initiated when the first server application or the first server platform SP1 indicates more or less utilization of the maximum processing capacity, e.g. when a threshold value for the utilization is exceeded or under-shot, respectively. A pull-based message is a request initiated by the data center DC to the first server platform SP1 or the first server application, and the utilization information is sent U200 in a response to that request. The received utilization information may trigger an analysis U25 at the data center DC, e.g. in order to check for consistency before the determined utilization information is transmitted T25 to the management center MC. The determination F10 of the required processing capacity is executed from the received utilization information. For example, if the utilization information comprises a record of the utilization of the maximum processing capacity by the first server application, the management center MC may analyze the record for estimating future utilization of the maximum processing capacity by the first server application. Estimations may be based on extrapolation or pattern recognition techniques applied to the record.

For executing the analysis F20 of the required processing capacity, i.e. the future utilization of the maximum processing capacity according to this example, the management center MC may consider further information like further utilization information or further future required processing capacities of one or more further server applications, e.g. operating on the first server platform SP1. In the analysis F20, it can be checked if a value according to the determined required processing capacity can be assigned to the capacity fraction of the first server application. Reasons for not assigning the capacity fraction to the value according to the required processing capacity are for example a required processing capacity exceeding the maximum processing capacity, if at least one further server applications may get disturbed by the assignment, or because of priorities attributed to the server applications. In the analysis F20, a value for the assignment of the capacity fraction is determined by the management center. A management command can be generated in order to instruct the first server platform SP1 to assign the capacity fraction to the first server application to the determined value. Further management commands may be generated e.g. for installation or de-installation, or further assignments. According to the scenario shown in FIG. 2, an installation of an upgrade version of the first server application may be a further result of the analysis F20. The management center MC may detect that a transmittable and installable upgrade version of the first server application is stored on a further server platform SP2 located closer to the first server platform SP1 than the management center MC. If more than one server platform has a transmittable and installable upgrade version of the first server application stored, the management center may select the server platform coming closest to the first server platform SP1. The expression "closer/closest" not only mean a physical distance but also transmission properties like bandwidth or delay of links. The management center MC can retrieve the address of the closest server platform, i.e. the further server platform SP2 in FIG. 2, and can generate a command message CM20 comprising the management commands for the assignment of the capacity fraction of the first server application on the first server platform SP1 and for the installation of the upgrade version of the first server application SA1 to the first server platform SP1. In addition, the command message CM20 may comprise an instruction for the further server platform SP2 to send the upgrade version of the first server application SA1 to the first server platform SP1. The command message CM20 is transmitted to the further server platform SP2 which can process PC20 the received command message CM20 and retrieve the upgrade version of the first server application e.g. from its memory. The further server platform SP2 generates an allocation message AM20 comprising the upgrade version for the first server application for installation on the first server platform SP1 and the management command for the assignment of the capacity fraction to the first server application, i.e. the upgraded first server application according to the present example. The further server platform SP2 sends the allocation message AM20 to the first server platform SP1, where the assignment of the capacity fraction for the first server application SA1 and the installation of the update version can be executed E20. The first server platform SP1 and the further server platform SP2 may report a result of the execution of the management commands to the management center MC or the data center DC (messages for result not shown in FIG. 2). The result may also be used for synchronization SYNCH of the message center MC with the data center DC with respect to changes of network information. In the synchronization SYNCH, the data center DC may inform the management center MC on the result of the management, e.g. that an upgraded version of the first server application has been installed on the first server platform SP1 and that an assignment of the capacity fraction to the first upgraded server application has been executed. The synchronization SYNCH can also be achieved by recording a history of a number of dynamic managements, e.g. by the management center MC, and sending the history to the data center DC on request or at predefined time intervals, wherein a single dynamic management within the history may be characterized by identifiers of the server applications and server platforms involved in the management, one or more required processing capacities, the time of the determination of the one or more required processing capacities, the determined capacity fraction, further management commands like installation, de-installation or further assignments, and a time and one or more results for the execution of the assignment and the further management commands. If the execution of one or more of the management commands fails, the method may be repeated for the failed management command. Alternatively, the failure may trigger a further dynamic management starting with an analysis of the failure.

Figure 3B:
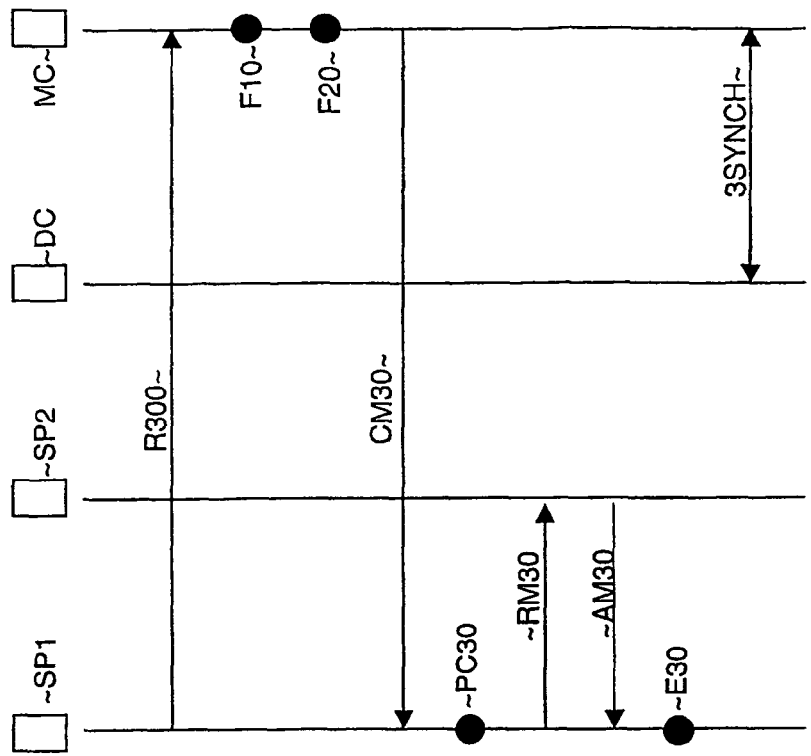
FIG. 3b shows exemplary messages and processes of the second embodiment of the present invention.
Figure 3A:
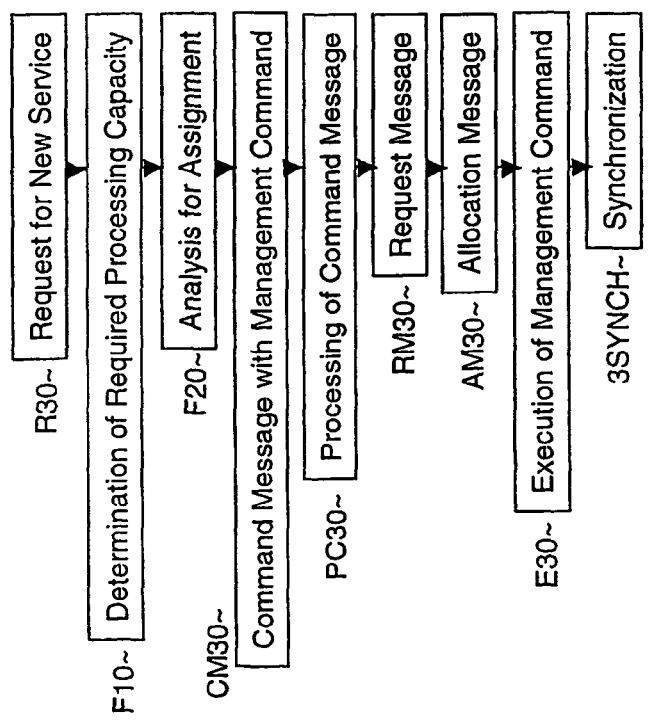
FIG. 3a shows a flow-chart diagram of a second embodiment of the present invention.

FIG. 3 shows an alternative to the embodiment described in FIG. 2 for an assignment of a capacity fraction combined with an installation of a server application to the first server platform SP1. On the first server platform SP1, a new service may be requested R30 not covered by the first server platform SP1. One or more requests for the new service can be been recorded by the first server platform SP1 and can be reported R300 directly to the management center MC as shown or, alternatively, via the data center DC to the management center MC (not shown in FIG. 3). Depending on the implementation of the method, it may be sufficient that only a number of requests exceeding a threshold value is reported R300 or that a record of the requests over time is reported R300. Based on the reported requests, the determination F10 of the required processing capacity can be executed. Following the present example, the required processing capacity can be a processing capacity that is needed for processing a server application providing the new service according to the requests. The server application providing the new service is named new server application in the following. The required processing capacity may be dimensioned according to the reported number of requests or to an extrapolated number of requests. Also estimations based on experiences of the operator of the telecommunication system may be considered for the determination F10 of the required processing capacity. The management center MC executes an analysis F20 of the required processing capacity for the assignment of the capacity fraction to the new server application and determines a value for the capacity fraction. The management center MC generates a management command for the assignment and a further management command for the installation of the new server application to the server platform SP1. Alternatively to FIG. 2, the management center MC can send a command message CM30 comprising the management commands to the first server platform SP1. The command message CM30 may comprise the new server application for installation, e.g. in file format, or as shown in FIG. 3 according to the present example, an instruction for the first server platform SP1 to fetch the new server application from the further server platform SP2. This instruction may be supplemented by an address of the further server platform SP2 and an identifier for identifying the new server application on the further server platform SP2. The first server platform SP1 processes PC30 the received command message CM30 and sends a request message RM30 to the further server platform SP2 for fetching the new server application. The request message RM30 may comprise an instruction for the further server platform SP2 to send the new server application to the first server platform SP1. The further server platform SP2 executes the received instruction and sends the new server application by an allocation message AM30 to the first server platform SP1 for installation. The allocation message AM30 comprises the new server application and may be supplemented by an instruction for installation if necessary. The first server platform SP1 receives the allocation message AM30 and performs an execution E30 of the management commands for installation and assignment of the capacity fraction to the new server application. Results on the management may be reported, and finally, a synchronization 3SYNCH between the data center DC and the management center MC may be executed with respect to the changes introduced by the dynamic management, e.g. installation of the new server application on the first server platform SP1 and assignment of the capacity fraction for the new server application.

Figure 4:
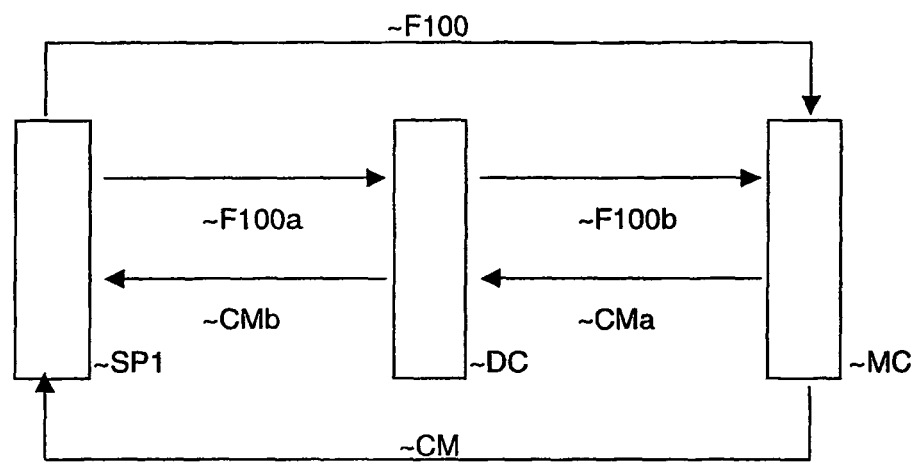
FIG. 4 shows a first example for devices adapted to execute the invented method and messages between the devices.

In FIG. 4, a first example for devices and messages between the devices for executing the present invention is shown. Depending on the implementation of the method, a first server platform SP1 may send a message F100a to a data center DC for the determination the required processing capacity. This message F100a can comprise utilization information and is received by a receiving unit of the data center DC. The received information may be analyzed in a processing unit of the data center DC, e.g. for consistency or completeness, and may be sent by a message F100b via a transmitting unit of the data center DC to a receiving unit of a management center MC. Alternatively, the messages F100a and F100b may be transparently sent via the data center DC to the management center MC or a message F100 for the determination of the required processing capacity is directly sent from a transmitting unit of the first server platform SP1 to a receiving unit of management center MC. The received information is analyzed in a processing unit of the management center MC for the assignment of capacity fraction to e.g. the first server application and the optional generation of further management commands. The management command for the assignment and the optional further management commands can be included into a command message CMa, which can be sent from the transmitting unit of the management center MC to the receiving unit of the data center DC to be further sent via message CMb from the transmitting unit of the data center DC to the receiving unit of the first server platform SP1. Alternatively, the management center may directly send the one or more management commands to the first server platform via command message CM for execution.

Figure 5:
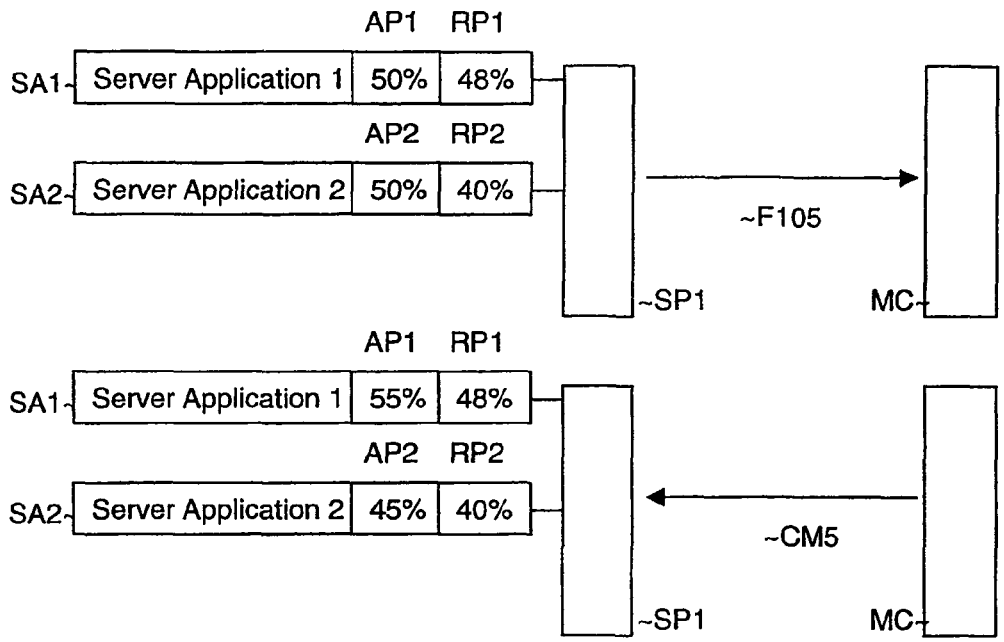
FIG. 5 shows a second example for devices adapted to execute the invented method, messages between the devices, capacity fractions and required processing capacities of the server applications involved.

FIG. 5 shows a second example for devices and messages for executing the present invention. A first server platform SP1 has allocated a first server application SA1 and a further server application SA2 with a first capacity fraction AP1 reserved for processing the first server application SA1 and a further capacity fraction AP2 reserved for processing the further server application SA2. In the present example, the first capacity fraction AP1 and the further capacity fraction AP2 are assigned both to 50% of the maximum processing capacity of the server platform SP1. The required processing capacity RP1 of the first server application SA1 and the required processing capacity RP2 of the further server application SA1 may be monitored by the server platform SP1. According to the present example, the required processing capacities RP1;RP2 can be given by the actual utilization of the maximum processing capacity of the server platform SP1, e.g. the first server application SA1 utilizes 48% of the maximum processing capacity and the further server application SA2 utilizes 40% of the maximum processing capacity. The required processing capacity RP1 of the first server application SA1 comes very close to the first capacity fraction AP1 and disturbances may occur if the required processing capacity RP1 further increases. The first server platform SP1 informs the management center MC by sending a message F105 comprising at least the required processing capacity RP1 of the first server application SA1.

The required processing capacity RP1 of the first server application SA1 is transferred as input for the following analysis for the assignment of the first capacity fraction AP1. It is advantageous to provide the management center MC also with the first capacity fraction AP1 and the further capacity fraction AP2, the required processing capacity RP2 of the further server application SA2, and optionally with priority information of both server applications SA1;SA2 to be considered in the analysis. Providing the management center also with the required processing capacities of further server applications enables the management center to better check for consequences of an assignment of a first capacity fraction AP1 to the first server application. The determination of the required processing capacity RP2 may be executed within the analysis F20, e.g. by a pull message issued by the management center MC to the first server platform SP1, wherein the pull message requests the required processing capacity RP2 and the first server platform SP1 responds with it to the management center MC. Alternatively, a server platform may be configured to provide the required processing capacities of all its server applications to the management center MC, e.g. for cases if a required processing capacity of the server applications approaches or exceeds a threshold value. In accordance with the present example, the first server platform SP1 may be configured to send the required processing capacities RP1;RP2 via message F105. In addition to the assignment of the first capacity fraction AP1, the analysis F20 may generate further management commands, e.g. for an assignment of the further capacity fraction AP2. The management commands for both assignments can be sent via a command message CM5 to the first server platform SP1, where the management commands can be executed. Following the example of FIG. 5, the assignment of the first capacity fraction AP1 to an increased value of 55% is executed. In addition to the management of the first server application SA1, the further capacity fraction AP2 is decreased to 45%.

Figure 6:
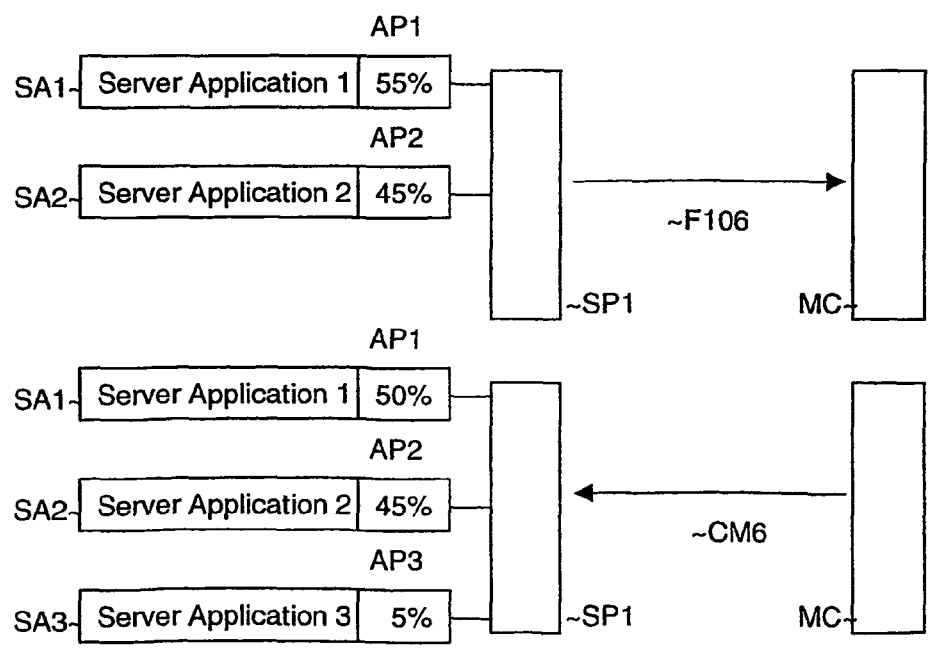
FIG. 6 shows a third example for devices adapted to execute the invented method, messages between the devices, and capacity fractions of the server applications involved.

In FIG. 6, a first server platform SP1 has allocated a first and a further server application SA1;SA2 with a first and a further capacity fraction AP1;AP2 amounting to 55% and 45% of the maximum processing capacity of the first server platform SP1, respectively. The first server platform SP1 may detect that a new service is requested on the server platform SP1 with the new service being not covered by the first server application SA1 and the further server application SA2. In the present example, the determination of the required processing capacity can be triggered by the indication of the lack of the new service on the first server platform SP1 e.g. supplemented by the number of requests as explained in the context of FIG. 3. The indication may be sent via message F106 to the management center MC. The management center MC can obtain that the new service may be covered by a third server application SA3. The required processing capacity can be the processing capacity needed for processing the requested new service on the first server platform SP1 according to the number of requests for the third server application SA3. In order to ensure that the new service can be provided according to the required processing capacity, processing capacity has to be reserved for the third server application SA3 on the first server platform SP1. However, it is advantageous to check for priorities and the required processing capacities of the server applications SA1;SA2 operating on the first server platform SP1 in order to check for consequences of the possible assignment of a third capacity fraction AP3 to the third server application on the first server platform. The checking may be also extended to further server applications or further server platforms (not shown in FIG. 6) of the telecommunication system if consequences on network level are to be expected. As a result of the analysis, the management center MC can generate the following management commands: assignment of the first capacity fraction AP1 to 50%, installation of the third server application SA3, and assignment of the third capacity fraction AP3 reserved for processing the third server application SA3, e.g. to a value of 5%. According to the present example, the further server application SA2 is not affected by the dynamic management and the further capacity fraction AP2 remains 45%. Finally, the management commands can be sent via the command message CM6 to the first server platform SP1, which can perform an execution of the management commands and a subsequent reporting on the results of the execution, e.g. to the management center MC.

Figure 7:
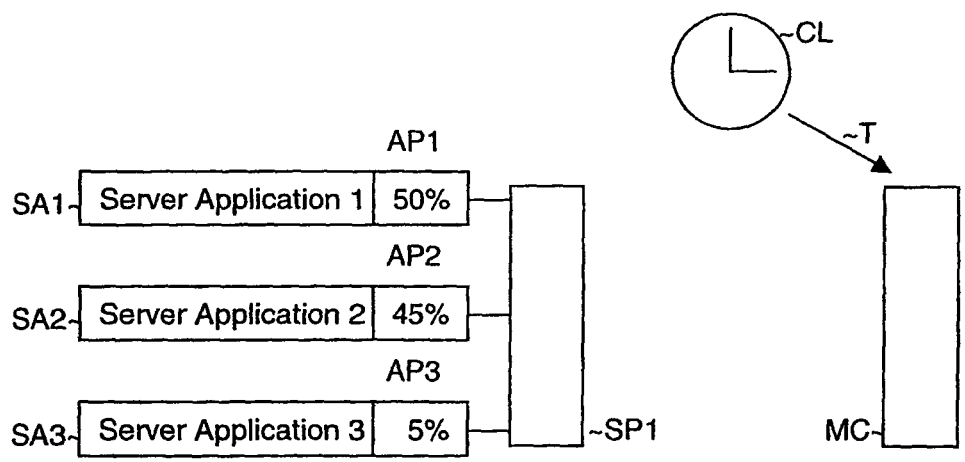
FIG. 7 shows a fourth example for devices adapted to execute the invented method, messages between the devices, and capacity fractions of the server applications involved.
Figure 7:
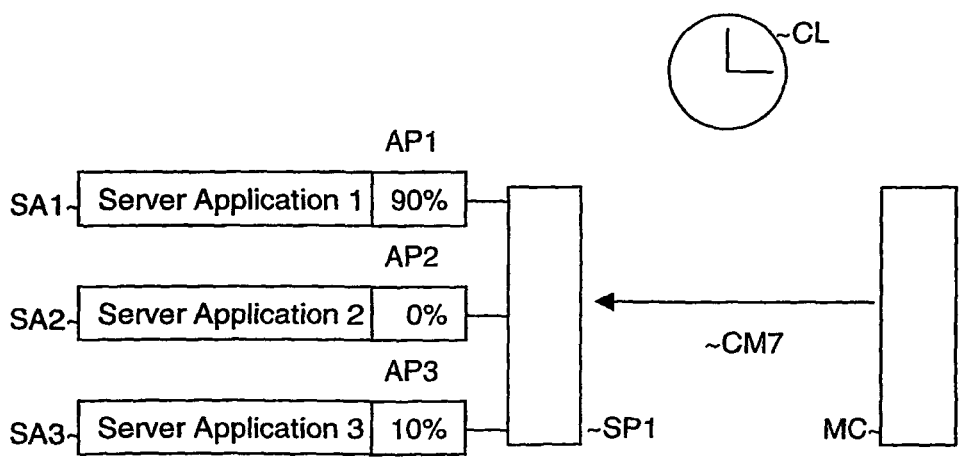

In FIG. 7, a time-triggered dynamic management is described for a first server platform SP1 having allocated three server applications SA1;SA2;SA3 with corresponding capacity fractions AP1;AP2;AP3 that are assigned to 50% for the first server application SA1, to 45% for the further server application SA2, and to 5% for the third server application SA3. A timer CL delivers a time T to the management center MC triggering the determination of a required processing capacity at the management center MC. The timer CL may also be incorporated in the management center MC. The management center can search in a database for entries associated with the time T and may find required processing capacities of the three server applications SA1;SA2;SA3 on the first server platform SP1. The database may be a table relating times with server applications and required processing capacities, wherein a server application may have different required processing capacities for different times. The database may also reveal further management commands like installation or de-installation related to server applications and times which may be used for time-triggered dynamic management. According to the present example, the management center MC finds an entry for the time T revealing that the required processing capacity of the first server application SA1 is 90% of the maximum processing capacity and corresponding entries for the required processing capacity of the further server application SA2 and the third server application SA3 of 0% and 10%, respectively, of the maximum processing capacity. Based on the required processing capacities for the three server applicatoris, the current utilization of the server platform may be analyzed or further checks can be made if necessary. The capacity fractions AP1;AP2;AP3 may be assigned to the determined required processing capacities, e.g. the management center may generate management commands for the first server platform SP1 to assign the capacity fractions AP1;AP2;AP3 to the values of the determined required processing capacities of the server applications SA1; SA2;SA3, i.e. 90% for the first capacity fraction AP1, 0% for the further capacity fraction AP2, and 10% of the third capacity fraction AP3. Finally, the management commands for the assignments can be sent via the command message CM7 to the first server platform SP1 where the capacity fractions AP1;AP2;AP3 are assigned accordingly. Depending on the implementation, the setting of the further capacity fraction AP2 to 0% can have the result that the further server application AP2 is not processed on the first server platform SP1 or that the further server application AP2 is de-installed from the first server platform SP1.

Figure 8:
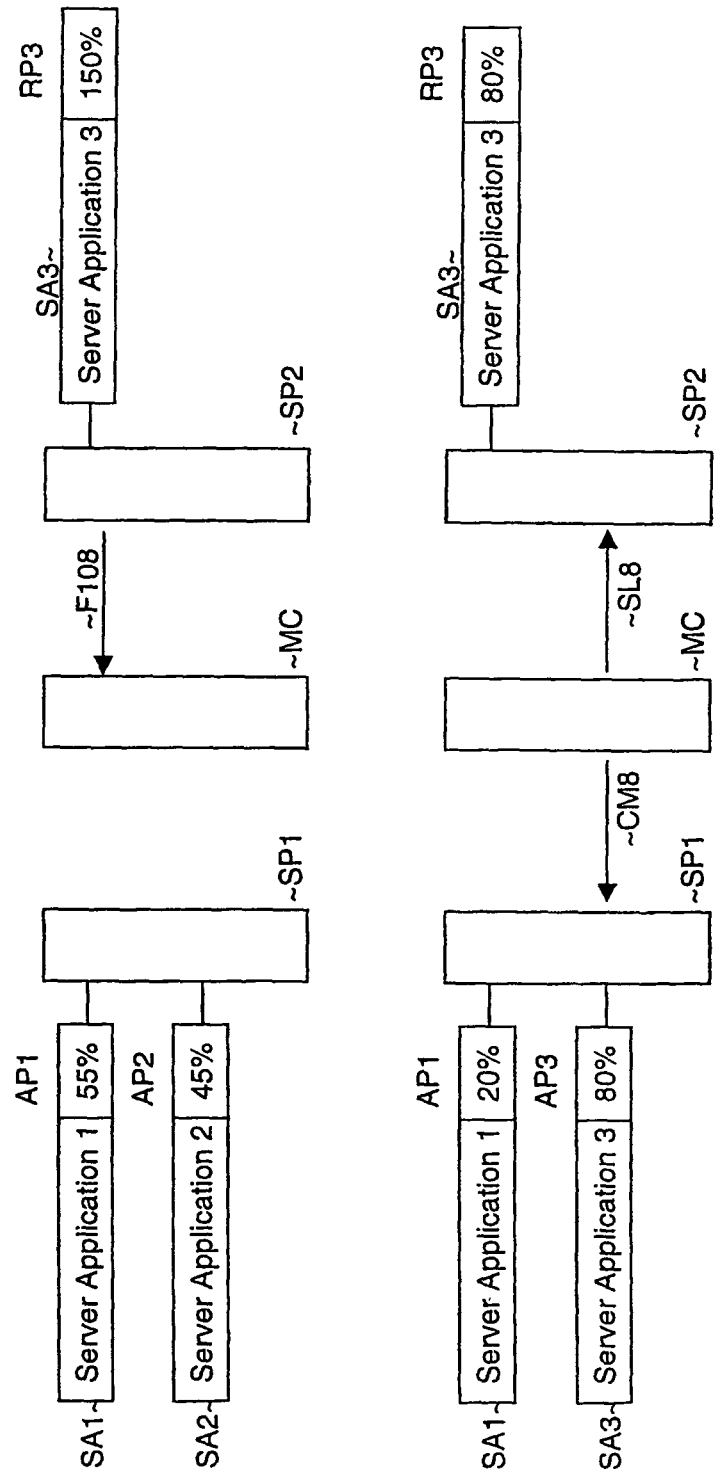
FIG. 8 shows a fifth example for devices adapted to execute the invented method, messages between the devices, and capacity fractions of the server applications involved.

FIG. 8 describes an example, where three server applications SA1;SA2;SA3 on a first server platform SP1 and a further server platform SP2 are managed. On the first server platform SP1, the first server application SA1 and the further server application SA2 are operating with a first capacity fraction AP1 and a further capacity fraction AP2 of 55% and 45%, respectively. In addition, the third server application SA3 is operating on the further server platform SP2. The required processing capacity RP3 for the third server application SA3 may exceed a predefined value, e.g. the maximum capacity of the further server platform SP2, e.g. because of a peak situation. According to the present example, the required processing capacity RP3 amounts to 150%, which can be reported by the message F108 to the management center MC for analysis. In the analysis the overload situation of the further server platform SP2 by the third server application SA3 is detected. The management center MC may decide to allocate processing capacity for the third server application SA3 on the first server platform SP1 and to shift load like the number of users registered to the third server application SA3 on the further server platform SP2 to the first server platform SP1. Management commands can be generated and transmitted via a command message CM8 to the first server platform SP1 to manage the server applications SA1; SA2;SA3 as follows: a de-installation of the further server application SA2 from the first server platform with the de-installation including an elimination of the further capacity fraction AP2 reserved for processing the further server application SA2, an assignment of the first capacity fraction AP1 to 20% of the maximum processing capacity of the first server platform SP1, an assignment of a third capacity fraction AP3 reserved for processing the third server application SA3 on the first server platform SP1 to 80% of the maximum processing capacity, and installation of the third server application SA3 on the first server platform SP1.

Finally, the further server platform SP2 can be instructed to shift load from the third server application SA3 on the further server platform SP2 to the third server application SA3 on the first server platform SP1, reducing the utilization of the maximum processing capacity of the further server platform SP2 by the third server application SA3 e.g. from 150% to 80%. The instruction to shift load may be sent via the command message SL8 to the third server platform.

An example for a telecommunication system with implemented invention is given in FIG. 9. The depicted telecommunication system is a mobile telecommunication system according to 3GPP Release 4 or 5 (see e.g. 3GPP Technical Specification Group Services and System Aspects; Network Architecture (Release 5), TS 23.002, version 5.5.0 (2002-01)) adapted to execute the proposed method. The mobile communication system can comprise a core network CN, access networks AN1;AN2, and mobile devices MS attachable to one or more of the access networks AN1;AN2. Connections IAM between the mobile devices MS and the access networks AN1;AN2 and connections ICA between the access networks AN1;AN2 and the core network CN exist that can be used for making calls or transferring data between one or more of the mobile devices MS and the core network CN. The access network AN1 is an UMTS radio access network (UTRAN) comprising a radio network system RNS, a media gateway MGW and base stations BS and the access network AN2 is a General Packet Radio Service radio access network (GERAN) comprising a base station controller BSC and base stations BS.

In the core network CN, many server platforms SP1';SP2'; SP3';SP4' exist that have installed or operating many server applications SA1'-SA11'. According to the present figure, the server platform SP1' may carry an MSC Server SA1', an SGSN server SA2', and a CSCF proxy SA3', the second server platform SP2' may carry an MSC Server SA4', an SGSN server SA5', and a CSCF proxy SA6'. The third server platform SP3' may carry service enablers SA7', portals & content servers SA8', and application servers SA9', and the fourth server platform SP4' may carry an MSC server SA10' and a Media Gateway Control Function (MGCF) SA11'. In addition, a management center MC' and a home subscriber server HSS1 exists.

The management center MC' is shown as a centralized network node for providing a dynamic management on network level, i.e. a dynamic management of any of the server applications SA1'-SA11' on any of the server platforms SP1'; SP2';SP3';SP4'. There may be also implementations where a management center is distributed in the telecommunication system, e.g. by a separate device per server platform or by a software application operating per server platform. However, for providing a dynamic management on multiple server platforms, a communication between the distributed separate devices or software applications of the server platforms involved for executing the analysis for the assignment is necessary. There may be also implementations, where several management centers are operated in a telecommunication system, e.g. for different regions or for different operators. Especially for large area networks, a segmentation into regions with a management center per region may be more reasonable than to have a centralized network node, e.g. because a dynamic management of any of the server applications in a first region has no or only negligible influence on the server platforms or server applications in a further region. Management centers for different operators may be especially advantageous in multi-operator telecommunication systems, i.e. server platforms or server applications used by different operators.

The home subscriber server HSS1 is the master database for a subscriber of the mobile telecommunication system. The location update mechanism can be used for counting the number of users that are currently registered to any of the server applications SA1'-SA11', e.g. the home subscriber server HSS1 counts the number of users of the server application SA3' on the first server platform SP1'. Preferably, the home subscriber server HSS1 can be supplemented with a table wherein the server applications SA1'-SA11' supervised by the home subscriber server HSS1 are related to counted number of users. The counted number of users per server platform or server application may be used directly for the determination of the required processing capacity. A shortcoming of the present implementation of the actual location update mechanism in a home subscriber server is that roaming subscribers are not counted. However, the number of roaming subscribers is typically negligible thus not limiting the dynamic management for the case that the location update mechanism in a home subscriber server is used.

The home subscriber server HSS1 can be used by the management center MC' for the determination of the required processing capacity represented e.g. by the utilization of the server platforms SP1';SP2';SP3';SP4' by the server applications SA1'-SA11' in the core network CN. The required processing capacity may be transmitted from the server platforms SP1';SP2';SP3';SP4' to the home subscriber server HSS1 via interfaces IR. Push- or pull-based messages may be used. Alternatively, the required processing capacity, e.g. the counted number of users for a server application, may be transmitted from the home subscriber server HSS1 to the management center MC' via a synchronization interface SI which may be also used for the synchronization of the management center MC' with the home subscriber server HSS1.

Command messages comprising management commands for the assignment of a capacity fraction e.g. to the first server application SA1', for installation, de-installation, or further assignments of further capacity fractions can be transmitted via the management interfaces IM. The management command for an assignment of a capacity fraction may comprise an identifier for identifying the server platform, e.g. the first server platform SP1', a server application identifier identifying the managed server application, e.g. the first server application SA1', and a value indicating the capacity fraction, e.g. 30% of the maximum processing capacity. The management command for the assignment of 30% of the maximum processing capacity to the first server application SA1' on the first server platform SP1' may be set up by a triplet like <SP1'; SA1';30> with SP1' identifying the first server platform, SA1' identifying the first server application, and 30 indicating that 30% of the maximum processing capacity is to be assigned to the first server application SA1'. The installation of a server application to any of the server platforms SP1';SP2';SP3'; SP4' can be done by means of file transfer, the transport of a mobile agent, or a servlet (Java). The interfaces IM can be used for installation of a server application from the management center MC to the server platforms SP1';SP2';SP3';SP4'. For installation of a server application from a server platform, interfaces interconnecting the server platforms SP1';SP2'; SP3';SP4' can be used. These interfaces are not shown in FIG. 9.

The management interfaces IM or the interfaces IR may be used to report the result of the execution of the management commands to the management center MC' or the home subscriber server HSS1, respectively. Synchronization between the management center MC' and the home subscriber server HSS1 may be carried out via the synchronization interface SI.

The management center MC' and the Home Subscriber Server HSS1 can be logical nodes that may be physically combined. If push- or pull-based mechanisms are applied for the determination of the required processing capacity to the management center, a dynamic management can be executed without a data center, i.e. the home subscriber server HSS1 in FIG. 9.

The above embodiments admirably achieve the objects of the invention. However, it will be appreciated that departures can be made by those skilled in the art without departing from the scope of the invention which is limited only by the claims.

The invention claimed is:

1. A method for a dynamic management of (1) a first server application and a second server application on a first server platform of a telecommunication system, and (2) a third server application on a further server platform of the telecommunication system, wherein the first server platform having a maximum processing capacity, and wherein the further server platform having a maximum processing capacity, said method in a management center comprising:
   detecting an overload situation on the further server platform;
   in response to detecting the overload situation, transmitting a command message to the first server platform to manage following:
      de-installing the second server application on the first server platform, wherein the de-installing of the second server application includes an elimination of a previously assigned capacity fraction of the maximum processing capacity of the first server platform to the second server application;
      assigning a capacity fraction of the maximum processing capacity of the first server platform to be reserved for the first server application;
      assigning another capacity fraction of the maximum processing capacity of the first server platform to be reserved for the third server application; and
      installing the third server application on the first server platform;
   further in response to detecting the overload situation, transmitting another command message to the further server platform to manage following:
      shifting load from the third server application on the further server platform to the third server application on the first server platform.

2. The method of claim 1, wherein the detecting an overload situation on the further server platform further comprises:
   detecting an overload situation of the third server application on the further server platform.

3. The method of claim 1, wherein the transmitting another command message to the further server platform also manages the following: assigning a capacity fraction of the maximum processing capacity of the further server platform to be reserved for the third server application.

4. A management center for a dynamic management of (1) a first server application and a second server application on a first server platform of a telecommunication system, and (2) a third server application on a further server platform of the telecommunication system, wherein the first server platform having a maximum processing capacity, and wherein the further server platform having a maximum processing capacity, said management center comprising:

a processor that executes a computer program stored on a computer readable medium to enable following operations:

detecting an overload situation on the further server platform;

in response to detecting the overload situation, transmitting a command message to the first server platform to manage following:

de-installing the second server application on the first server platform, wherein the de-installing of the second server application includes an elimination of a previously assigned capacity fraction of the maximum processing capacity of the first server platform to the second server application;

assigning a capacity fraction of the maximum processing capacity of the first server platform to be reserved for the first server application;

assigning another capacity fraction of the maximum processing capacity of the first server platform to be reserved for the third server application; and installing the third server application on the first server platform;

further in response to detecting the overload situation, transmitting another command message to the further server platform to manage following:

shifting load from the third server application on the further server platform to the third server application on the first server platform.

5. The management center of claim 4, wherein the detecting an overload situation on the further server platform further comprises:

detecting an overload situation of the third server application on the further server platform.

6. The management center of claim 4, wherein the transmitting another command message to the further server platform also manages the following: assigning a capacity fraction of the maximum processing capacity of the further server platform to be reserved for the third server application.

* * * * *